O. CLEMENT.
CLOSURE DEVICE.
APPLICATION FILED FEB. 2, 1914.

1,101,835.

Patented June 30, 1914.
2 SHEETS—SHEET 1.

WITNESSES:
Ludger A. Nicol.
Vera J. Durman.

INVENTOR.
Oliver Clement
BY
Gardner D. Pearson
ATTORNEY.

O. CLEMENT.
CLOSURE DEVICE.
APPLICATION FILED FEB. 2, 1914.

1,101,835.

Patented June 30, 1914.
2 SHEETS—SHEET 2.

WITNESSES:
Ludger A. Nicol.
Urra J. Queenan.

INVENTOR.
Oliver Clement
BY
Gardner W. Pearson
ATTORNEY.

UNITED STATES PATENT OFFICE.

OLIVER CLEMENT, OF DRACUT, MASSACHUSETTS.

CLOSURE DEVICE.

1,101,835.  Specification of Letters Patent.  Patented June 30, 1914.

Application filed February 2, 1914. Serial No. 815,974.

*To all whom it may concern:*

Be it known that I, OLIVER CLEMENT, a citizen of Canada, residing at Dracut, in the county of Middlesex and State of Massachusetts, have invented certain new and useful Improvements in Closure Devices, of which the following is a specification.

This invention relates to closure devices and has special application to doors for closing the back end of wagons used for transporting ice.

Figure 1:
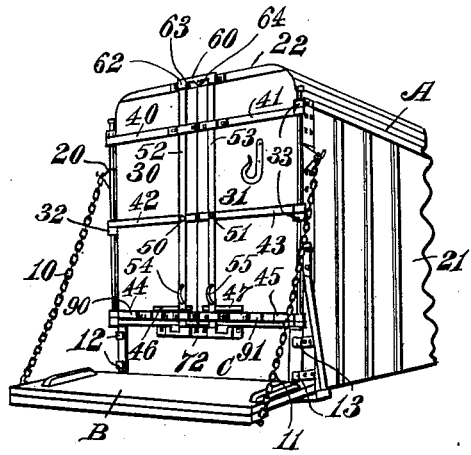
Figure 2:
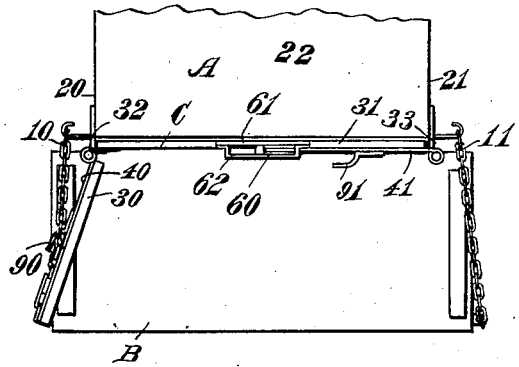
Figure 4:
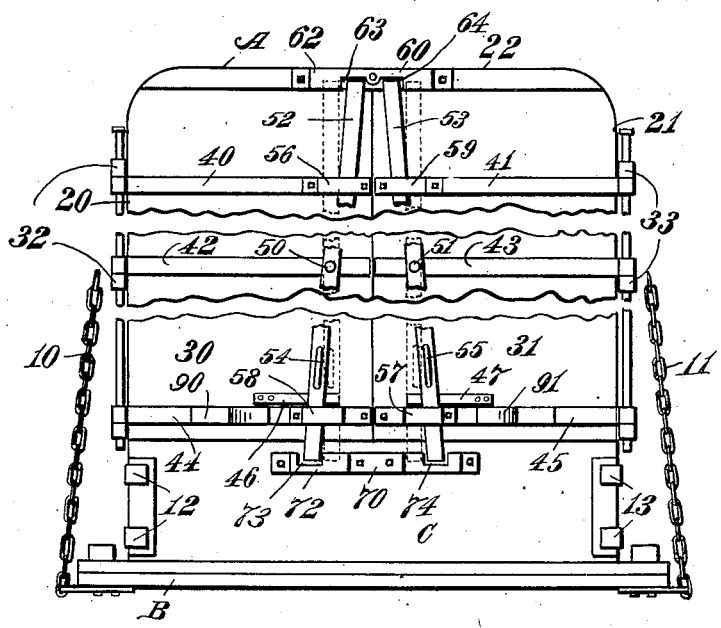
Figure 3:
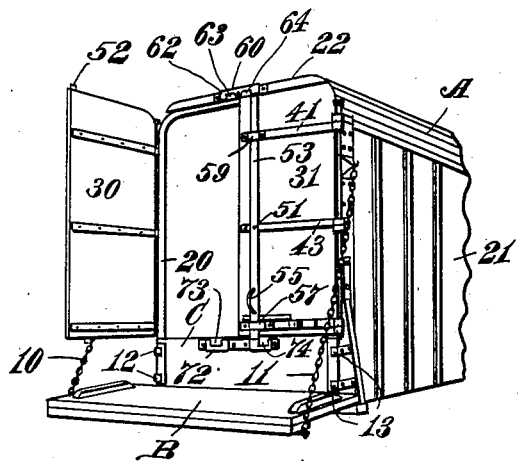
Figure 5:
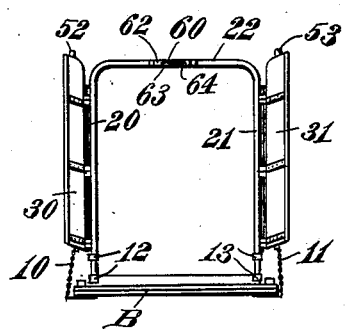
Figure 6:
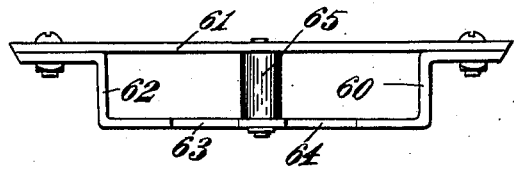
Figure 7:
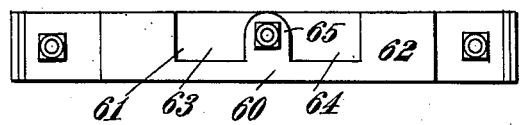
Figure 8:
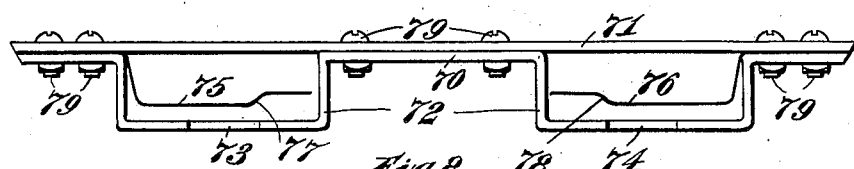
Figure 9:
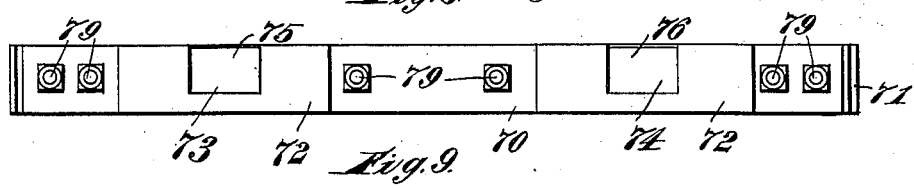

The device is especially adapted for ice wagons but it may be used for vehicles for carrying other merchandise if desired.
In the drawings, Figure 1 is a rear perspective view of the back end of the wagon with the doors closed and locked. Fig. 2 is a plan view of the back end of a wagon with one door opened and the other closed and fastened. Fig. 3 is a view similar to Fig. 1 showing one door open and the other closed. Fig. 4 is a rear elevation enlarged showing the operation of the fastening bars. Fig. 5 is a rear elevation of a wagon with the doors open and the locking board removed. Fig. 6 is a plan view of the top catches. Fig. 7 is an elevation thereof. Fig. 8 is a plan view of the bottom catches. Fig. 9 is an elevation thereof.
A represents the body of a wagon and B is a tail board which is always down in the position shown and is held in place by diagonal chains 10 and 11 which connect with the sides 20 and 21 of the wagon. At the bottom is a locking board C which sets vertically against the ends of the sides 20 and 21 and is held in place by bracket guides 12 and 13 as shown. To reach the floor of the wagon, it may be slid up and removed as shown in Fig. 5. Hinged to the ends of sides 20 and 21 are the back doors 30 and 31, carried by hinges 32 and 33. These doors 30 and 31 are preferably of wood and are strengthened by horizontal metal straps 40, 42, 44, and 41, 43, 45.

Pivoted at 50 and 51 on straps 42 and 43 respectively are the vertical locking bars 52 and 53. Each has an operating handle 54, 55 and passes through guides 56 and 58 on straps 40 and 44 and 59 and 57 on straps 41 and 45. Attached to the top 22 of the wagon is a catch 60 shown in detail in Figs. 6 and 7. This catch comprises a base bar 61 to which is bolted a strip 62 so bent into loops that the bars 52 and 53 can pass between 61 and 62 through the square notches 63 and 64 in strip 62. Preferably a bolted brace 65 is used for stiffening in the center between base bar 61 and strip 62.

Preferably attached to the locking board C is a bottom catch 70 which also comprises a base bar 71 and a double looped strip 72 which is bolted to 71 by a series of bolts 79 and which has suitable square notches 73 and 74 in its loops through which the ends of bars 52 and 53 can pass. In each loop of the bottom fastening catch is a spring 75 or 76 clamped between the ends of 71 and 72 and arranged with a double bend at the fixed end and a double bend with an oblique section at 77 and 78 near the free end. Each spring should be so adjusted that its oblique section will bear against a corner of one of the bars 52 or 53 thereby holding it from slipping out of place.

To lock the device, the doors are closed with the bars swung apart at the bottom in which position they will pass through the notches 63, 73, 64, 74 which admit the bars in behind the strips 62 and 72. When inside, the handles 54 and 55 are brought together as shown in Fig. 1 which action forces the ends of bars 52, 53 in behind the part of bands 62 and 72 which is not notched in such a manner that the spring 75 or 76 after being pressed back will come forward and the oblique portions 77 and 78 will bear against the corner of a bar 52 or 53 whereby the bar will be prevented from slipping or rattling out of place.

I prefer to attach to each door 30 and 31, a horizontally extending finger or hook 90 or 91 in such a position that when the door to which it is attached is swung back against its adjoining chain 10 or 11, that chain can be slightly lifted and dropped inside the finger whereby the door will be held open as long as desired.

In the full lines of Fig. 4 are shown the positions of the bars when the device is unlocked and when the doors can be opened. In the dotted lines are shown the position of the bars in the locked position.

The vertical locking bars are centrally pivoted near the swinging edge of each door and are of such length and so arranged that the both ends of each bar register either with the notches or with the unnotched part of a top and of a bottom catch.

To hold the locking bars in the open position and to prevent them from rattling, I prefer to use behind each a spring 46 or 47 which normally bears against the inside of a bar thereby holding it in place by friction.

It is clear that my device may be used on a single door as each door acts independently and the locking device on each is independent except for its connection with the locking board. It is clear that the parts of the wagon compose a casing with an opening therein having a top, bottom and side or sides and that the doors, catches and locking bars might be applied to any similar casing with an opening therein. It is also clear that the locking board might be fixed in position or that if it should become stuck in place, it would be substantially fixed and the operation of the closure device would not be affected.

I claim:

1. In a closure device, the combination of a casing having a top, bottom and side, with a door hinged thereto, a top catch having a base bar and a looped strip with a notched portion and an unnotched portion attached to the top, a bottom catch having a base bar and a looped strip with a notched portion and an unnotched portion attached to the bottom, and a locking bar centrally pivoted to the door in such position that its ends will register with the notched portions of the top and bottom catches or the unnotched portions thereof, together with a spring fixed at one end between the base bar and the looped strip of the bottom catch and so bent that it has an oblique section near the free end in operative relation with the end of the locking bar.

2. In a closure device, the combination of a casing having a top, bottom and side, with a door hinged thereto, a top catch having a base bar and a looped strip with a notched portion and an unnotched portion attached to the top, a bottom catch having a base bar and a looped strip with a notched portion and an unnotched portion attached to the bottom, and a locking bar centrally pivoted to the door in such position that its ends will register with the notched portions of the top and bottom catches or the unnotched portions thereof, together with a spring fixed at one end between the base bar and the looped strip of the bottom catch and so bent that it has an oblique section near the free end in operative relation with the end of the locking bar, and a friction spring so attached to the door as to bear against the inside of the locking bar.

3. In a closure device, the combination of the back of a wagon having a top, two sides and a bottom, with bracket guides attached to each side, a locking board vertically slidable therein and which normally rests upon the bottom, two doors hinged respectively to each side, a top catch having a base bar and a looped strip with two loops each having a notched portion and an unnotched portion said catch being attached to the wagon top, a bottom catch having a base bar and a looped strip with two loops each of which has a notched portion and an unnotched portion said catch being attached to the top of the locking board, and two locking bars each centrally pivoted near the free edge of a door in such position that its ends will register respectively with a notch in a top catch and a bottom catch or with the unnotched portions thereof.

4. In a closure device, the combination of the back of a wagon having a top, two sides and a bottom, with bracket guides attached to each side, a locking board vertically slidable therein and which normally rests upon the bottom, two doors hinged respectively to each side, a top catch having a base bar and a looped strip with two loops each having a notched portion and an unnotched portion said catch being attached to the wagon top, a bottom catch having a base bar and a looped strip with two loops each of which has a notched portion and an unnotched portion said catch being attached to the top of the locking board, and two locking bars each centrally pivoted near the free edge of a door in such position that its ends will register respectively with a notch in a top catch and a bottom catch or with the unnotched portions thereof, together with two springs each fixed at one end between the base bar and a looped strip of the lower catch and so bent that it has near its free end an oblique section in operative relation with a locking bar.

5. In a closure device, the combination of the back of a wagon having a top, two sides and a bottom, with bracket guides attached to each side, a locking board vertically slidable therein and which normally rests upon the bottom, two doors hinged respectively to each side, a top catch having a base bar and a looped strip with two loops each having a notched portion and an unnotched portion said catch being attached to the wagon top, a bottom catch having a base bar and a looped strip with two loops each of which has a notched portion and an unnotched portion said catch being attached to the top of the locking board, and two locking bars each centrally pivoted near the free edge of a door in such position that its ends will register respectively with a notch in a top catch and a bottom catch or with the unnotched portions thereof, together with two springs each fixed at one end between the base bar and a looped strip of the lower catch and so bent that it has near its free end an oblique section in operative relation with a locking bar, a tail board connected with the sides by diagonal chains, and horizontally extending fingers one attached to each door in such position as to engage a chain when the door is swung outward.

In testimony whereof I, hereto affix my signature in presence of two witnesses.

OLIVER CLEMENT.

Witnesses:
  LIDGER A. NICOL,
  GARDNER W. PEARSON.